(12) United States Patent
Rüegg et al.

(10) Patent No.: US 12,492,894 B2
(45) Date of Patent: Dec. 9, 2025

(54) LASER SCANNER WITH STEREO CAMERA VISION FOR IMPROVED SELECTIVE FEATURE SCANNING

(71) Applicant: LEICA GEOSYSTEMS AG, Heerbrugg (CH)

(72) Inventors: Marcel Rüegg, Baden (CH); Matthias Wolf, Suhr (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 349 days.

(21) Appl. No.: 18/241,063

(22) Filed: Aug. 31, 2023

(65) Prior Publication Data

US 2024/0077310 A1 Mar. 7, 2024

(30) Foreign Application Priority Data

Sep. 1, 2022 (EP) ..................................... 22193533

(51) Int. Cl.
*G01C 15/00* (2006.01)
*G01C 11/02* (2006.01)
(Continued)

(52) U.S. Cl.
CPC .......... *G01C 15/002* (2013.01); *G01C 11/025* (2013.01); *G01C 11/18* (2013.01); *G01S 7/51* (2013.01); *G01S 17/894* (2020.01)

(58) Field of Classification Search
CPC .... G01C 15/002; G01C 11/025; G01C 11/18; G01S 7/51; G01S 17/894; G01S 17/42;
(Continued)

(56) References Cited

U.S. PATENT DOCUMENTS

| | | | |
|---|---|---|---|
| 8,638,446 B2* | 1/2014 | Briggs | G01S 17/89 33/503 |
| 9,903,950 B2* | 2/2018 | Walsh | G02B 26/10 |

(Continued)

FOREIGN PATENT DOCUMENTS

| | | | | |
|---|---|---|---|---|
| KR | 101339616 B1 * | 12/2013 | | G06T 7/246 |
| WO | WO-2008089792 A1 * | 7/2008 | | G01C 15/002 |
| WO | WO-2020119912 A1 * | 6/2020 | | G06Q 50/08 |

OTHER PUBLICATIONS

Extended European Search Report dated Feb. 24, 2023 as received in Application No. 22193533.1.

*Primary Examiner* — Yaritza Guadalupe-Mccall
(74) *Attorney, Agent, or Firm* — Maschoff Brennan (57) ABSTRACT

A selective laser scanner, comprising a target component which can be rotated about two rotation axes and is configured to transmit a distance measuring beam defining a target axis. The selective laser scanner further comprises a distance measuring unit configured to carry out distance measurements by means of the distance measuring beam on cooperative targets or on diffusely scattering targets. The selective laser scanner is equipped with a plurality of overview cameras arranged on the target component offset from the target axis in a fixed positional arrangement with respect to each other having field of views which at least partly overlap each other. The selective laser scanner further comprises a display for displaying an environment image provided by imaging data of at least one of the cameras as well as automatic feature and area detections.

17 Claims, 7 Drawing Sheets

(51) Int. Cl.
*G01C 11/18* (2006.01)
*G01S 7/51* (2006.01)
*G01S 17/894* (2020.01)

(58) Field of Classification Search
CPC ............... G01S 17/86; G01S 17/89; G06T 2207/10024; G06T 2207/20081; G06T 2207/20084; G06T 2207/20228; G06T 2207/30208; G06T 7/593; G06T 7/85; H04N 13/239; H04N 13/156; H04N 13/246; H04N 13/271
See application file for complete search history.

(56) References Cited

U.S. PATENT DOCUMENTS

| | | | | |
|---|---|---|---|---|
| 9,945,938 | B2* | 4/2018 | Markendorf | G01S 7/4972 |
| 10,282,855 | B2* | 5/2019 | Stigwall | G06T 7/593 |
| 10,495,756 | B2* | 12/2019 | Walsh | G02B 26/10 |
| 12,008,679 | B2* | 6/2024 | Mueller | G01C 11/08 |
| 12,135,371 | B2* | 11/2024 | Walsh | H04N 13/271 |
| 2010/0030515 | A1 | 2/2010 | Kludas et al. | |
| 2012/0057174 | A1* | 3/2012 | Briggs | G01S 17/89 356/603 |
| 2013/0342657 | A1* | 12/2013 | Robertson | H04N 13/239 348/47 |
| 2017/0365065 | A1* | 12/2017 | Stigwall | H04N 23/56 |
| 2021/0136350 | A1* | 5/2021 | Zweigle | G06T 7/55 |
| 2022/0172406 | A1 | 6/2022 | Mueller et al. | |
| 2024/0077310 | A1* | 3/2024 | Rüegg | G06T 7/85 |

* cited by examiner

LASER SCANNER WITH STEREO CAMERA VISION FOR IMPROVED SELECTIVE FEATURE SCANNING

BACKGROUND

The present disclosure relates to a selective laser scanner for industrial surveying equipped with stereo camera vision which provides parallax error compensation between a laser target axis and a visual camera axis.

Currently various laser trackers and scanners use a camera to enable the user to identify and select features and areas of interest to scan. Often such a camera is called overview camera (OVC). This camera is rigidly mounted within the telescope of the device and always moves with the measurement beam. Thus, the user can see the scene live from the viewpoint of the scanner and can select points of interest in camera image.

Laser trackers according to the prior art can be embodied having an optical image acquisition unit having a two-dimensional, light-sensitive array, for example, a CCD or CID camera or a camera based on a CMOS array, or having a pixel array sensor and having an image processing unit. The laser tracker and the camera can be installed one on top of another in this case, in particular in such a manner that the positions thereof relative to one another are not variable. In alternative embodiments, the camera can be installed in an integrated construction together with the laser optic in a shared housing.

With the acquisition and analysis of an image by means of image acquisition unit and image processing unit of a so-called measuring aid instrument having markings, the relative location of which to one another is known, an orientation in space of an object, for example a probe, arranged on the measuring aid instrument can be concluded. Together with the determined spatial position of the target point, furthermore the position and orientation of the object in space can be precisely determined absolutely and/or in relation to the laser tracker.

By way of example, the selective laser scanner is a device to selectively scan areas or features in parts of the angular range without scanning all of the surrounding. Such a scanner consists of a target component mounted into two perpendicular rotation axes, thus creating a spherical coordinate system consisting of the three perpendicular axes of target axis (measurement beam), vertical rotation axis and horizontal rotation axis.

The selective scanner differs from full dome scanners. A full dome scanner is a similar device with two moving axes, but both move continuously at a uniform speed, covering the full dome. A selective scanner on the other hand, can move both axes at variable speeds, thus creating any scan pattern possible with variable point densities, only limited by acceleration and speed.

Possible scan patterns of the selective laser scanner are line scans (follow a poly-line), area scans (perimeter limited by polygons), or specific feature scans, where those features could be spheres, cylinders, holes, studs, threats, bolts, edges or other geometric shapes. In that case, a special movement pattern can be used to obtain geometric information, such as position and size, of the feature.

By way of example, the selective laser scanner is able to track a reflective target, i.e. a retroreflector.

The accompanying software gives the user a live view of the camera. There, the user can identify features and areas of interest to scan, plan the scan strategy and tell the system what to scan. In addition, there can be methods to move the axes of the scanner, take and save snapshots, and acquire a panoramic image.

Since it is mechanically and optically impossible, or limiting in camera parameters, to mount the camera in the center-point of the three axis, the camera is usually mounted "off-axis" from the actual measurement beam.

Therefore, the optical center of the camera is radially and tangentially shifted and the camera has a slightly different viewpoint of the scene, compared to the actual laser scanner. This creates a parallax, i.e. an apparent shift, between the two viewpoints. This parallax is a problem when converting image coordinates from the camera to coordinates of the laser tracker/scanner resulting in some inconvenience for the user, for example difficulties to direct the measurement beam (laser beam) to a point in the image. Therefore, to determine a correct scan strategy or to match a coordinate from one viewpoint (e.g. image coordinate) to that of another (e.g. scanner coordinate), a coordinate transformation, usually a translation and a rotation, must be performed between the two points. However, a correct transformation from camera to scanner coordinates is not possible without the distance information.

While coordinates in the system of the scanner are usually known, it measures two angles and one distance, those coordinates are not fully available in the camera image. The image is two-dimensional, consisting of pixel coordinates. If the optical parameters of the camera are known, those coordinates can be transformed into angles, but the distance information is missing.

If now the user selects a point of interest in the overview camera, that point could be anywhere on a line between the camera center and infinity. Where exactly on that line is unknown unless one knows the distance of that point. There are strategies to overcome that ambiguity using the scanner itself, but those strategies might be time consuming or inconvenient.

Typically, the user has to name and define each feature manually, which requires time and work. There are further disadvantages regarding the scan of whole areas. Currently the user has to manually draw the perimeter he wants to scan in the image. If areas of interest could be automatically identified the user would simply have to click the area instead of drawing it.

SUMMARY

It is the object of the present disclosure to provide an improved selective laser scanner, which eliminates deficiencies of the prior art.

It is also an object of the disclosure to provide a selective laser scanner which provides improved and automatic correlation between a laser target axis and a visual camera axis.

The disclosure relates to a selective laser scanner for industrial surveying, comprising a target component which can be rotated about two axes of rotation and is configured to transmit a distance measuring beam defining a target axis and a distance measuring unit configured to carry out a distance measurement by means of the distance measuring beam in a measuring mode, in which the distance measuring unit is set for distance measurement on a diffusely scattering target. The laser scanner further comprises a first and a second camera arranged on the target component, wherein the first and the second cameras are arranged offset from the target axis in a fixed positional arrangement with respect to each other and have field of views which at least partly overlap each other, and a display for displaying an environment image provided by imaging data of at least one of the first and the second camera.

By way of example, the second camera is arranged in a fixed camera position which is known in relation to the first camera and a scanner center (e.g. a rotation fix point during the scan with the measurement beam). The second camera defines a second field of vision, such that the fields of vision of the first and second cameras at least partially overlap and the second camera is arranged having its optical axis offset to the measuring axis. Furthermore, upon execution of the search functionality, the finding of the target is performed as a function of an integrated consideration of the first and second target positions. The two target positions determined in the two images are used jointly for this purpose for finding the target, i.e., the target is determined from a combination of the image information of the first and second images, wherein the items of information (target positions) of the images are "married" and the target is found on this basis.

By way of example, the distance measuring unit has a further measuring mode, in which the distance measuring unit is set for distance measurement on a cooperative target (e.g retroreflector, mirror, photogrammetric target). Thus, the distance measuring unit has two measurement mode, a first mode for measuring a cooperative target and a second measuring mode, in which the distance measuring unit is set for distance measurement on a diffusely scattering target.

The distance measuring unit can be configured such that upon execution of the search functionality, ambiguities, which are present upon a use of only the first target position, which was determined by means of the first camera, for finding the target and by way of a parallax provided by the measuring direction and the optical axes of the first and second cameras, are resolved by a mutual use of both the first and also the second target positions for finding the target.

According to one aspect the measuring mode comprises a user input functionality which is configured to provide displaying the environment image on the display, querying a user input, which selects a position in the environment image, particularly wherein the display is embodied as touch screen display for selecting the position in the environment image and provision of selection parameters, which define a sub-area of the environment image associated with the position in the environment image.

The user input functionality further provides analyzing a first image area of an image captured by the first camera, wherein the first image area is associated with the sub-area, and analyzing a second image area of an image captured by the second camera, wherein the second image area is associated with the sub-area, in order to identify a distinctive image feature captured by the sub-area, and derive a correspondence of the distinctive image feature in the image captured by the first camera and in the image captured by the second camera, and using the correspondence to derive control data which provide for moving the target component with respect to the two rotation axes such that the target axis is directed onto a position in the environment associated with the position in the environment image.

There is an established technique to obtain distance information from images. With a stereo camera system, mounting two camera systems (e.g. symmetrically or asymmetrically) to the measurement beam into the moveable part of the laser scanner with an offset between them, it is possible to determine the distance of pixels in the image. As long as both cameras view mostly the same scene from different positions, the distance to a measurement point and, for example, a depth map can be calculated. Since each pixel can be attributed to a distance, this distance can be calculated for overlapping pixels in both images. By way of example, the calculated depth maps can be designed in such a way that the distance of the pixels is expressed via a color-coding. For example, pixels that are very far away are colored red and the color changes over orange, yellow and green to blue for pixels that are very close to the cameras.

The basic principle to solve the parallax problem is triangulation. As long as matching pixels in both images can be identified, and the distance as well as the orientation of both cameras is known, the absolute distance can be triangulated/calculated. In other words, the pixel/feature in one image has to be on an epipolar line in the other image. The problem is identifying matching points in both images, but since the technique is widely used, many algorithms are available for this task, such as Feature Matching (SIFT) or Semi-Global-Matching. This principle also works with more than two cameras.

Once the distance of the pixel from the camera is calculated, camera coordinates can be completely transformed to scanner coordinates. It is also not necessary to display both images to the user, because one, or an artificial one, is enough. In order to perform accurate coordinate transformations, a calibration of both cameras to each other and to the scanner is necessary.

By way of example, calibration of such a stereo camera system includes intrinsic and extrinsic calibration. Intrinsic describes internal parameters of the camera, basically it is the transformation from pixel coordinates to angles. The extrinsic calibration describes the position and orientation of the camera. For the stereo camera it describes the orientation and distance of the two cameras to each other. Including the laser scanner, it can also mean the position of the stereo camera in regards of the laser scanner center.

To calibrate a simple stereo camera system existing method can be used. Such methods usually are performed with a pattern of points or circles. If the same pattern is viewed from different angles and distances, it should always results the same 3D coordinates.

This is an established method to calibrate stereo cameras. But a complication arises with the laser scanner. The laser scanner might not be able to see the pattern. A pattern only using image contrasts, might not be visible to the scanner or harder to determine accurately. In that case, special targets easily visible with camera and laser tracker/scanner system have to be used to calibrate the transformation from the camera system to the laser scanner. Such a calibration target might include an object that is visible to the scanner, like a sphere, and a contrast for the camera system. If the laser scanner is also a laser tracker, a retroreflector could be used as calibration target instead of a sphere.

In general, adding additional cameras to the system, resulting in additional viewpoints, enhances the quality of the distance calculation. This might not always be the case, especially if the geometry to place additional cameras is constrained. Nonetheless, adding additional cameras might have other benefits to the user.

Such benefits might be a different field of view, or if using fixed focus cameras, a different focal point. In that case, the additional cameras enhance the image for certain distances. The system could automatically determine which image to show to the user, depending on the distance determined from the stereo camera.

As described above, the view from the camera is not the same view as from the laser scanner. In some cases, this could be problematic for the user. Such a case might be that a point is visible from the camera, but obstructed from view for the scanner, or vice versa. In that case one would select something to scan, which is not visible from the scanner, or would be unable to select it even though it is visible to the scanner.

To overcome this problem, one can calculate a virtual image of the scene using the 3D information from the two images. With the distance information available for each pixel, and the color information in the image, a computer can render the 3D scene from any viewpoint, specifically the viewpoint of the laser scanner. This would completely eliminate the parallax and enables the user to see a camera image from the viewpoint of the actual scanner coordinate center, which makes clear if a point of interest is actually visible from the scanner center.

With this approach the user can see the calculated virtual image on a display and then select all features to be measured with a click on this feature or instruct the scanner to measure every feature in a perimeter. This automated feature detection disposes a high precision reference marker and enables the recognition of the feature type as well as the approximate size, position and orientation of the feature. It also suggests the correct scan configuration, reducing uncertainty to: ~1×feature size.

By way of example, the selective laser scanner has an automated area scan detection. This area detection recognize boundaries of objects in image coordinates and calculate the distance from the stereo cameras using the above described method. The user can edit the scan area afterwards by commands like: grow, shrink or move edge points. It is also possible to add, remove or combine polygons to the scan area. Additionally it is possible to estimate the scan density.

Therefore, it is greatly beneficial for the selective laser scanner if a distance information was available from the camera image. Even an inaccurate distance, 10% accuracy for example, will cut down scan time greatly.

Such methods could be implemented in different ways. Two possible examples are described here. One is using edge detection and feature extraction, the other is machine learning.

Edge detection methods can be used to identify scan perimeters, suggest appropriate scan jobs for the user and automate the scan area selection. A possible workflow for such an edge detection method is first using an edge detector like Canny, then performing a feature extraction like Hough Transformation. This would be an appropriate method to determine scan strategies for area scans or for line scans along or perpendicular to edges.

Using machine learning with images to recognize features is another popular method. In that case, a library of sample images with known feature coordinates and types is used as training data to train a neural net/model. The model is then saved in software and used on images from the scanner.

The feature recognition is usually performed in two steps: detection and classification. The first yields the position and size of the feature, the second tells the software what kind of feature it is. The first information can be used to create an appropriate scan perimeter, or simply move the scanner pointing at the feature. This can be enhanced by the stereo camera. The second information can be used to determine the correct scan strategy.

By way of example, the control data are derived such that an ambiguity due to a parallax by the target axis and the optical axes of the first and the second camera is resolved by mutual use of both the image captured by the first camera and the image captured by the second camera.

In a further embodiment, the correspondence is used to determine a photogrammetric distance by means of photogrammetry, wherein the photogrammetric distance is used to derive the control data, particularly to resolve the ambiguities due to the parallax.

In a further embodiment, the selection parameters are provided as a function of a distance, in particular to set the dimensions of the sub-area as a function of a distance.

In a further embodiment, the display is embodied as touch screen display, wherein the selection parameters are provided that dimensions and shape of the sub-area are matched to dimensions and shape of an area which corresponds to a covering projected vertically onto the display surface by a fingerprint of a user on the display surface when selecting the position in the environment image, and the distinctive image feature is identified by carrying out a selection from multiple candidate image features within the sub-area, wherein the candidate image feature which is closest to a central point of the sub-area is identified as the distinctive image feature.

In a further embodiment, the user input functionality is configured to generate a zoomed-in environment image for the querying of the user input, such that the position in the environment image is selected by selecting a position in the zoomed-in environment image and to provide the selection parameters such that the sub-area of the environment image is part of the zoomed-in environment image.

In a further embodiment, the user input functionality is configured to generate a depth map of the sub-area, wherein the depth map is used to derive the control data to move the target component onto a further position in the environment associated with a further user input associated with the sub-area, particularly wherein an ambiguity due to the parallax by the target axis and the optical axes of the first and the second camera is resolved, more particularly wherein the user input functionality is configured to provide a selection of the sub-area by user input.

In a further embodiment, the selective laser scanner is configured to use the correspondence to determine a photogrammetric distance measuring accuracy associated with a photogrammetric distance measurement involving the distinctive image feature, determine a region of interest around the position in the environment as a function of the photogrammetric distance measuring accuracy, and carry out a coordinative measurement scan by scanning the region of interest with the distance measuring beam.

By way of the known relative positioning of the cameras and the known offset of the cameras in relation to the measuring axis, a distance to the target, on which the measurement beam is reflected, can be determined or calculated based on the reflections on the target acquired in the image on the basis of generally known principles of stereo photogrammetry.

If, in addition to a determined distance to the target, an item of direction information to the target is considered, a coarse position of the target can thus be calculated using the acquired images of the cameras. For this purpose, in each case directions can be derived from the target positions acquired in the images and linked to the items of distance information.

In a further embodiment, the selective laser scanner provides access to a database with identification data providing visual attributes of candidate image features, wherein the user input functionality is configured to query the database for the identification data and the identification of the distinctive image feature is carried out by using the identification data.

In a further embodiment, the user input functionality is configured to provide the environment image as a view of one of the two cameras or of a synthetic view image generated by images of both cameras, in particular, wherein the synthetic view image is calculated, so that it shows the environment from a viewpoint of the target axis (e.g. a viewpoint from a beam exit of the target component for transmitting the distance measuring beam or a viewpoint from a nodal point of the laser scanner). Once the 3D information is obtained from the images of both cameras, a completely new, synthetic image (view) can be calculated from the respective point cloud (distance estimation), which depicts the view from the centre (viewpoint) of the selective laser scanner. In other words, this is like placing a camera at the nodal point of the selective laser scanner. The advantage of such a solution is that much less stitching artefacts are obtained. Once the point cloud has been calculated from the two images, the angle of view can be easily converted to this point cloud.

In a further embodiment, the laser scanner, particularly the user input functionality, is configured to provide a panorama image based on at least two calculated synthetic view images generated on the basis of images of both cameras (e.g. synthetic view images providing a viewpoint from a nodal point of the laser scanner), in particular wherein the correspondence is used to determine a photogrammetric distance by means of photogrammetry, wherein the photogrammetric distance is used to calculate the at least two calculated synthetic view images. For a panorama image, the scanner is normally moved in such a way that the images of the two cameras have a small overlap to each other. Then the images are laid together touching. In the simplest case this leads to a "tiling" effect and the edges of the individual images are clearly visible in the panorama image. With the (plurality of) synthetic view image(s), this tiling effect can be avoided and a finer panorama image is obtained.

In a further embodiment, the selective laser scanner comprises at least a further camera, particularly wherein the first, the second and the further cameras are all fixed focus cameras, and the environment image is provided from one of the cameras as a function of a distance to an object to be measured.

In a further embodiment, the user input functionality is configured to provide a pre-selection of a pre-selected area as function of the position in the environment image (in which candidate features might be located) and identify at least parts of object features in the pre-selected area and select a distinctive object feature from the at least parts of the object features. The user input functionality is also configured to automatically determine geometric parameters of the distinctive object feature to derive object area delimiters around the distinctive object feature which enclose the distinctive object feature and use the geometric parameters to provide scan area information for carrying out a coordinative measurement scan within the area delimiters by scanning with the laser beam.

In a further embodiment, the selective laser scanner use an image of the first camera and an image of the second camera to generate a 3D information of an object to be measured, use the 3D information to determine a 6DoF pose of the object with respect to the selective laser scanner and use the 6DoF pose to derive control data for scanning the distance measuring beam along the object according to a defined scan pattern, particularly wherein the scan pattern provides physically equidistant scan points on a surface of the object.

In a further embodiment, the selective laser scanner is configured to generate a first 3D image of the environment from a first device position and generate a second 3D image of the environment from a second device position. The selective laser scanner is also configured to determine a reference of the first and the second 3D images with respect to a common coordinate system and use the reference to determine relative displacement information between the first and the second device position.

In a further embodiment, the selective laser scanner is configured to combine image data of the first and the second camera to determine geometric parameter providing information on the geometry of an object within the environment image (e.g. indicative of polygon boundaries to figure out polygon orientation of the object), particularly wherein the geometric parameter is determined by using the depth map 12 or by using a panoramic image derived from the image data of the first and the second camera, and, based thereof, to automatically adapt a scan density of a coordinative measurement scan of the object within the environment image (e.g. the object can be assigned to the position in the environment image).

DETAILED DESCRIPTION

Figure 1:
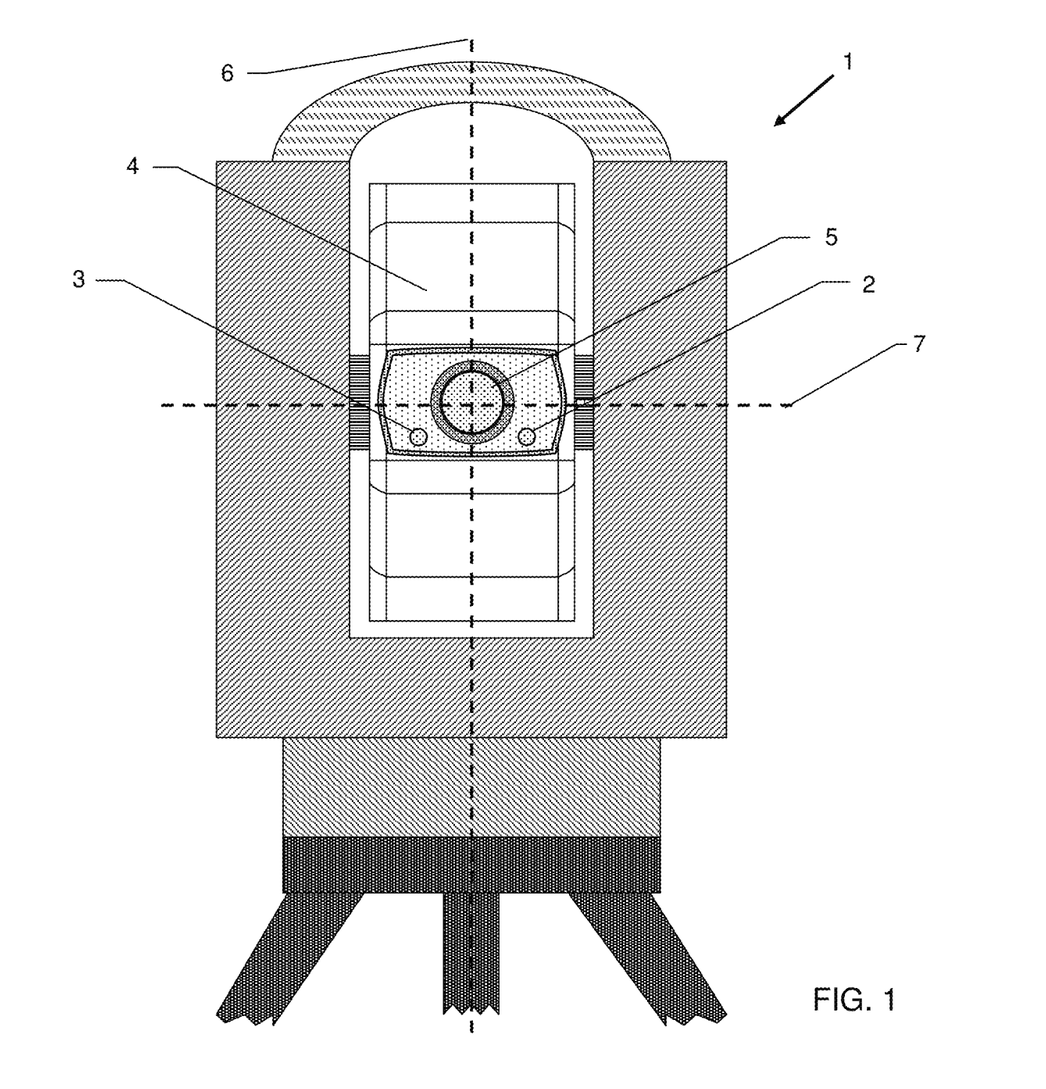
FIG. 1: embodiment of the selective laser scanner equipped with two cameras.

FIG. 1 depicts an embodiment of the selective laser scanner 1 equipped with two cameras 2, 3 arranged on the target component 4 at fixed positions and with a defined distance to each other and a defined distance to the laser scanner center 5 in each case. Furthermore, the cameras 2, 3 are arranged in such a manner that their fields of vision partially overlap. The target component 4 has two perpendicular rotation axes, a vertical rotation axis 6 and a horizontal rotation axis 7. The laser scanner center 5 is configured to transmit a distance measuring beam (laser beam) defining a target axis that is as focused as possible and perpendicular to the two perpendicular rotation axes 6, 7 creating a spherical coordinate system of vertical rotation axis 6, horizontal rotation axis 7 and target axis.

Figure 2:
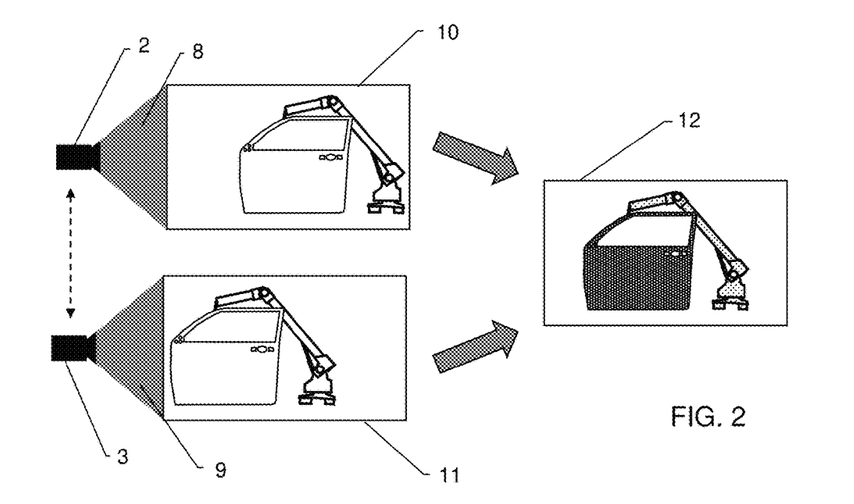
FIG. 2: visualization of the parallax caused by the two different camera visions and the resulting depth map calculation.

FIG. 2 depicts a visualization of the parallax caused by the two different camera visions 8, 9 and the resulting calculation of the depth map 12. Since the optical centers of the two cameras 2, 3 are shifted, both cameras 2, 3 have a slightly different viewpoint of the scene than the other camera and than the laser scanner 1. Thus, the objects in the upper image 10, which is generated by camera vision 8 of camera 2, are shifted slightly to the right, while the objects in the lower image 11, which is generated by camera vision 9 of camera 3, are shifted slightly to the left. This parallax is a problem for the user when converting image coordinates from the cameras 2, 3 to coordinates of the laser scanner 1, resulting in difficulties to direct the measurement beam to a point shown in one of the two images.

To solve this problem and to match a coordinate from one image (image coordinate) to that of the laser scanner 1 (scanner coordinate), a coordinate transformation, usually a translation and a rotation, must be performed between the two coordinates. However, a correct transformation from image to scanner coordinates is not possible without the distance information.

Both cameras 2, 3 view mostly the same scene from different positions, so a depth map 12 can be calculated to obtain the distance information. Since each pixel can be attributed to a distance, this distance can be calculated for overlapping pixels in both images 10, 11. By way of example, pixels of the car door, which are closer to the cameras 2, 3 than pixels of the crane, are illustrated darker than pixels of the crane.

Figure 3:
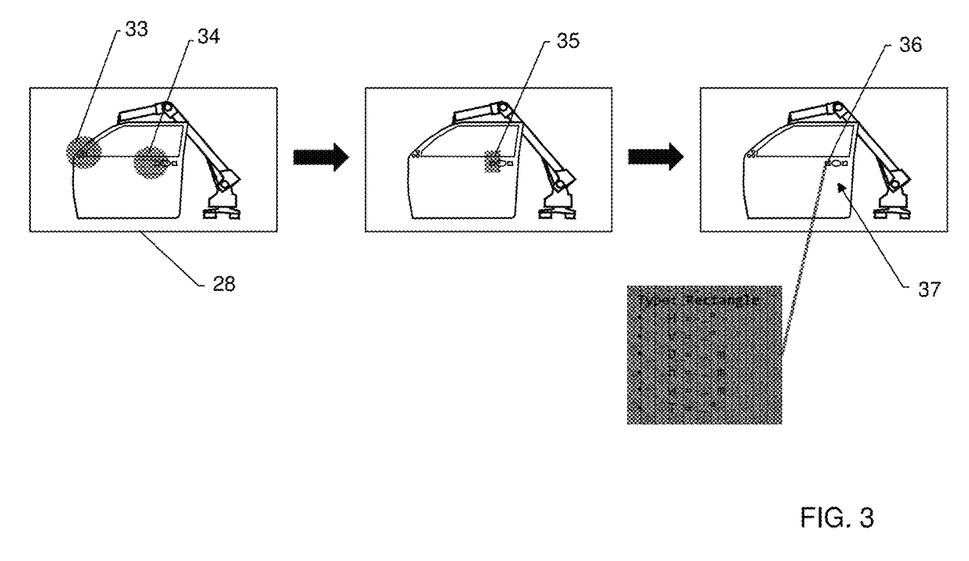
FIG. 3: visualization of the automated feature geometry and scan area delimiter determination.

FIG. 3 depicts a visualization of the automated feature geometry and scan area delimiter determination. The user input functionality of the selective laser scanner provide a pre-selection of the pre-selected areas 33, 34 as functions of their position in the environment image 28 in which object features might be located and show this pre-selected areas 33, 34 on the display of the selective laser scanner 1. The user can then select a pre-selected area (here shown as the pre-selected area 34), for example, via a touch screen display by touching on this area 34 with the finger, by what the selected area 34 is used to define a sub-area (here shown as the sub-area 35). In a further step the defined sub-area 35 is searched for at least parts of the object feature 36 and then the distinctive object feature 36 is selected from the at least parts of the object feature 36. Then the geometric parameters of the distinctive object feature 36 are automatically determined and the object area delimiters around the distinctive object feature 36 which enclose the distinctive object feature 36 are derived. In a last step the geometric parameters are used by this scan area information 37 for carrying out a coordinative measurement scan within the area delimiters by scanning with the laser beam are provided.

Figure 4:
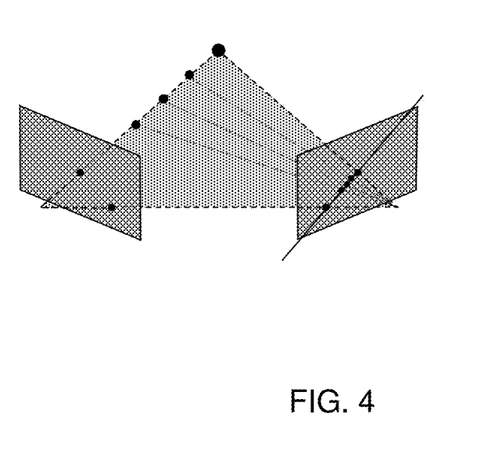
FIG. 4: visualization of the triangulation process.

FIG. 4 depicts a visualization of an exemplary triangulation process to solve the parallax problem. Matching pixels, e.g. the matching pixel 13, in both images 10, 11 are identified, wherein the distance as well as the orientation of both cameras 2, 3 and these pixels are known. Using this information, the absolute distance, i.e. the distance of the pixels to the scanner center 5, can be calculated, transforming the image coordinates to scanner coordinates. In other words, the pixels in one image has to be on an epipolar line 14 in the other image.

Figure 5:
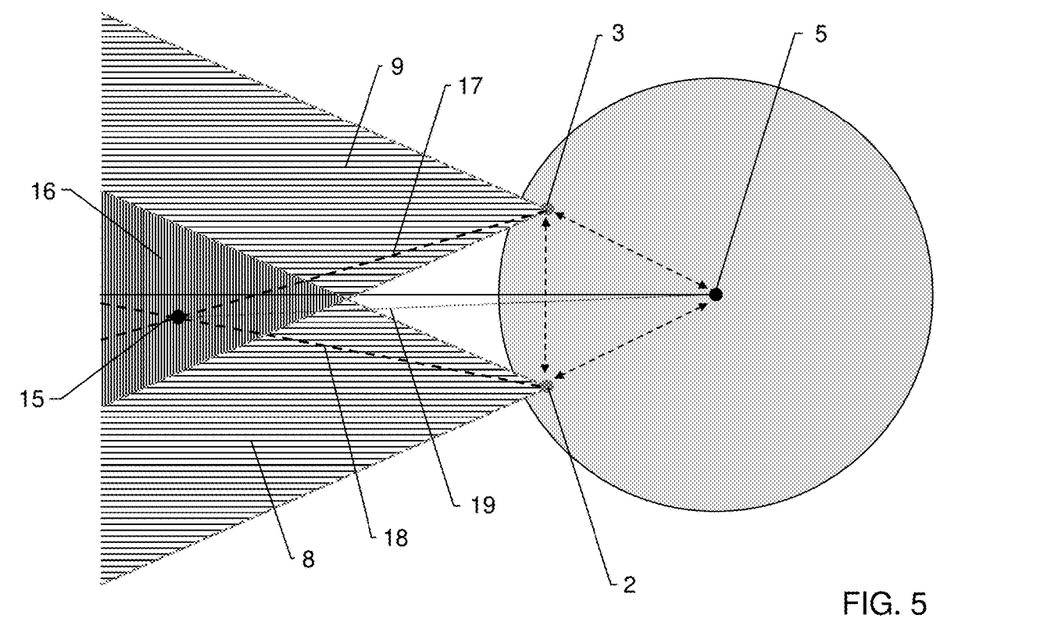
FIG. 5: visualization of the distance calculation enabled by a calibration of the two cameras to each other and to the laser center.

FIG. 5 depicts a visualization of the distance calculation enabled by a calibration of the two cameras 2, 3 to each other and to the scanner center 5. In order to perform accurate coordinate transformations to determine the exact distance of a point of interest 15 lying in the field of view 16, generated by the overlapping fields of view 8, 9, a calibration of both cameras 2, 3 to each other and to the scanner center 5 is necessary. After the calibration is completed, the exact orientation and distance of the two cameras 2, 3 to the point of interest 15 can be determined, illustrated by the dashed lines 17, 18. With this information, the coordinate transformation can be performed and the exact distance 19 of the point of interest 15 to the scanner center 5 can be determined.

Figure 6:
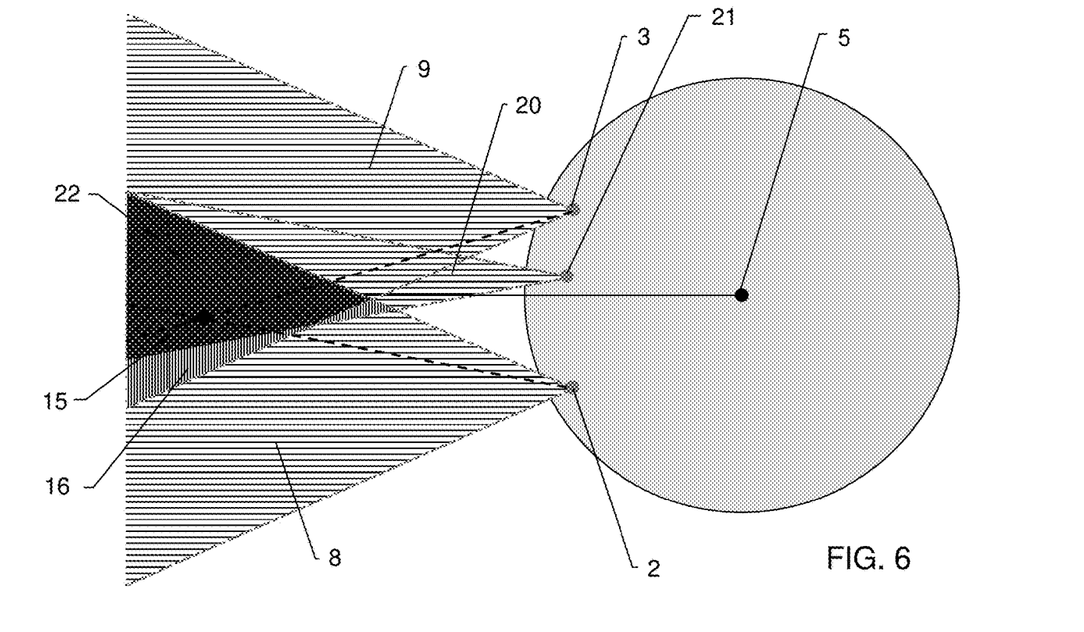
FIG. 6: visualization of the overlapping field of view of the selective laser scanner equipped with three cameras.

FIG. 6 depicts a visualization of the fields of view 8, 9, 20 of the selective laser scanner 1 according to an embodiment equipped with three cameras 2, 3, 21 resulting in the overlapping field of view 22. Since the third camera 21 generates another image of a scene resulting in additional viewpoints and thus more pixels available for the distance calculation, the quality of the distance calculation may be enhanced.

Figure 7:
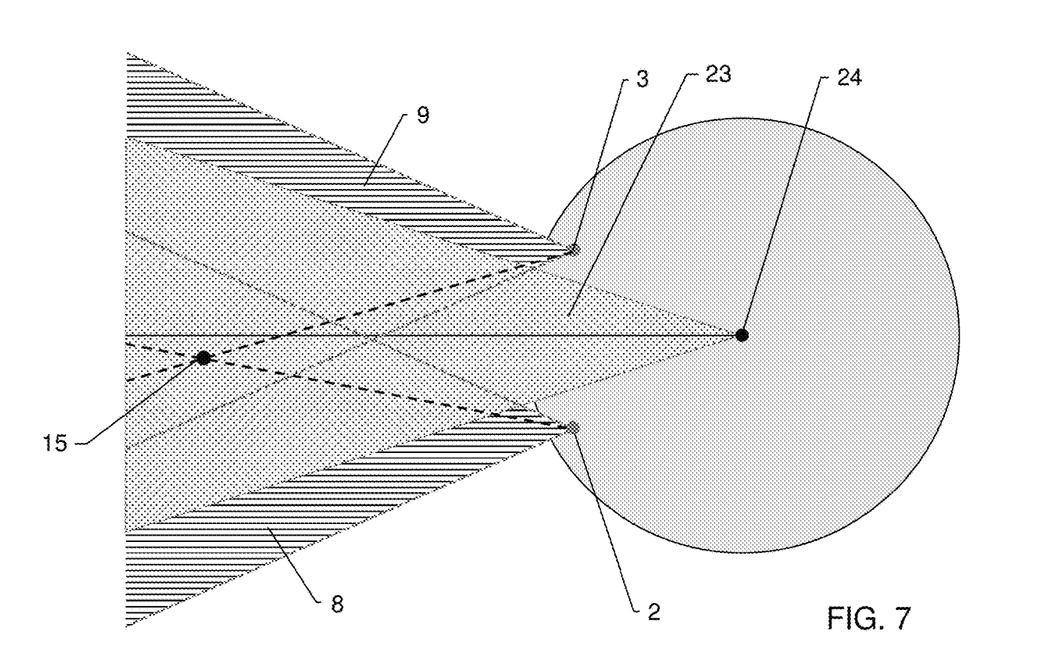
FIG. 7: visualization of the virtual image calculated by two images taken by the two stereo cameras.

FIG. 7 depicts a visualization of the virtual image 23 calculated by the 3D information from the two images 10, 11 taken by the two stereo cameras 2, 3. With the distance information available for each pixel, and the color information in the image, a computer can render the 3D scene from any viewpoint, specifically the viewpoint of the laser scanner 1. This eliminates the parallax and enables the user to see a virtual image 23 taken by the virtual camera 24 attached to the same position as the scanner center 5 and having the same viewpoint as the scanner center 5 that makes clear if a point of interest 15 is actually visible from the scanner center 5.

Figure 8:
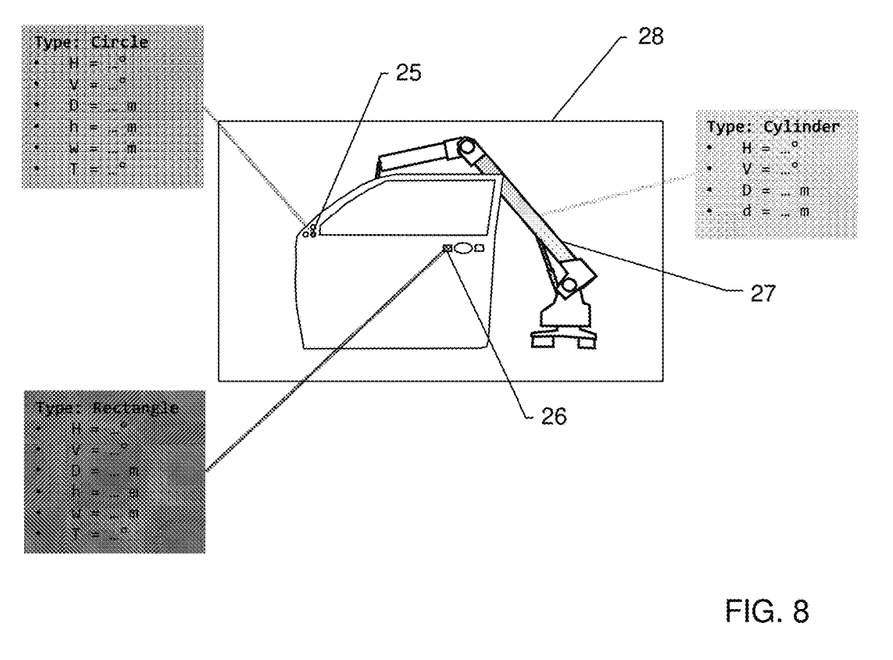
FIG. 8: visualization of the automated feature detection.

FIG. 8 depicts a visualization of an exemplary automated feature detection. The user see the environment image 28, on a display and then select the features 25, 26, 27 to be measured with a click on this features or instruct the scanner 1 to measure the features 25, 26, 27 in a perimeter. This automated feature detection enables the recognition of the feature type as well as the approximate size, position and orientation of the feature.

Figure 9:
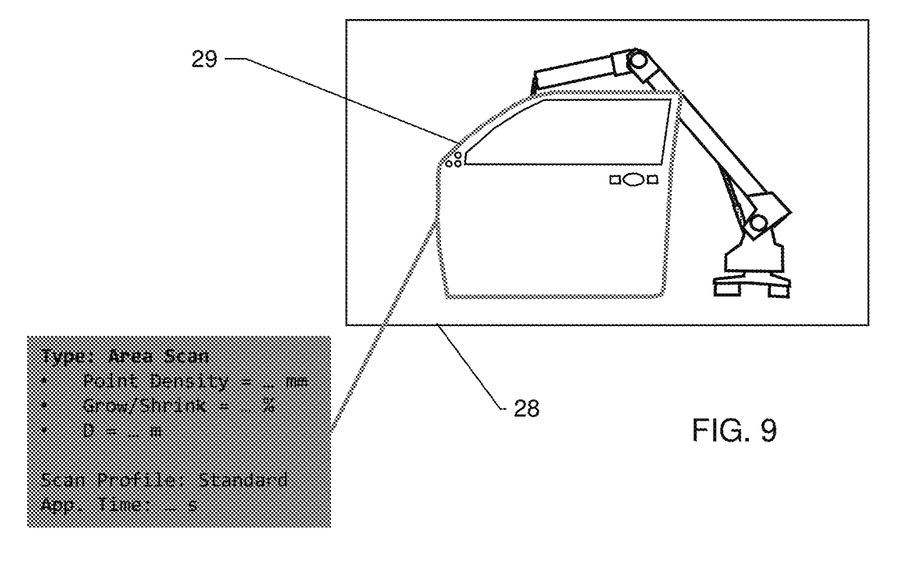
FIG. 9: visualization of the automated area scan detection.

FIG. 9 depicts a visualization of the automated area scan detection. This area detection recognize the boundaries of the object 29 in image coordinates and calculate the distance from the cameras 2, 3 using the above described method. The user can edit the scan area 29 afterwards by commands like: grow, shrink or move edge points. It is also possible to add, remove or combine polygons to the scan area.

Figure 10:
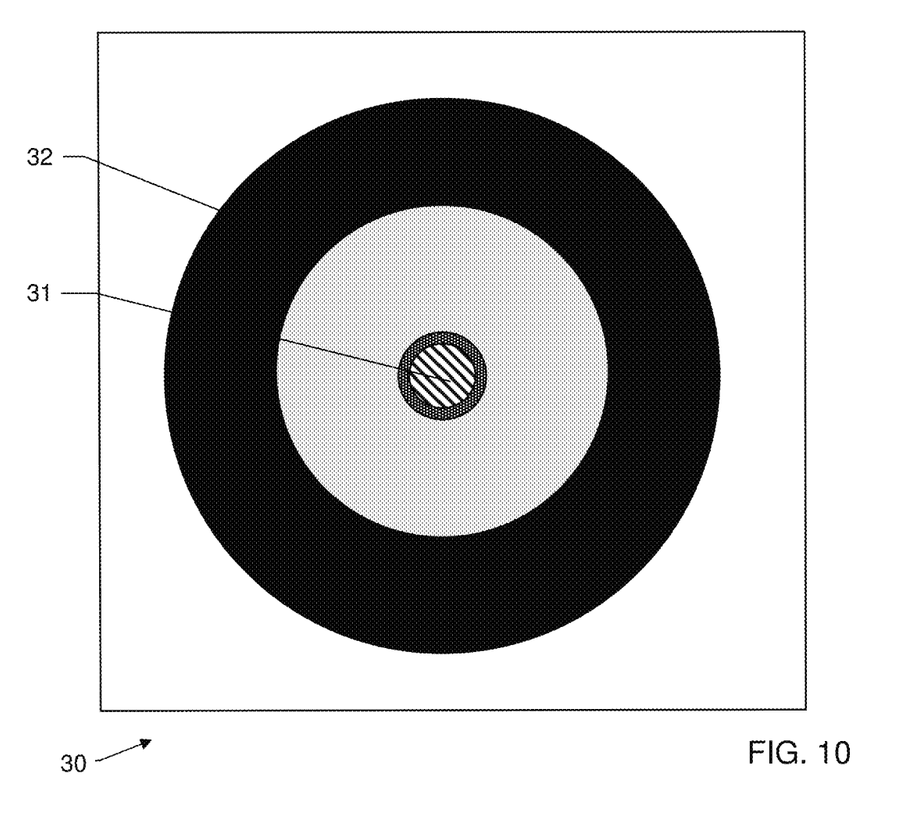
FIG. 10: embodiment of the calibration target.

FIG. 10 depicts an embodiment of a calibration target 30 which can be used to calibrate the laser scanner center 5 as well as the cameras 2, 3. Therefore a pattern of calibration targets embodied as the calibration target 30 can be used. The calibration target 30 includes an object that is visible to the laser scanner 1, in this case a retroreflector 31 and a contrast target 32 visible for the cameras 2, 3. For example, the positions of the laser scanner center 5 as well as the cameras 2, 3 to each other can be accurately determined by moving the calibration target 30 or by using multiple calibration targets. The laser scanner 1 emits a laser beam that is directed at the retroreflector 31 by which the laser beam is reflected. The reflected beam is recorded by the laser scanner 1, which allows calculation of the exact position and alignment of the laser scanner center 5. Furthermore, the contrast target 32 is recorded by the cameras 2, 3. Based on the captured images of both cameras 2, 3, the exact position of the cameras 2, 3 is calculated. In this way, the orientation and distance of the two cameras 2, 3 to each other in relation to the laser scanner center 5 is determined.

Figure 11:
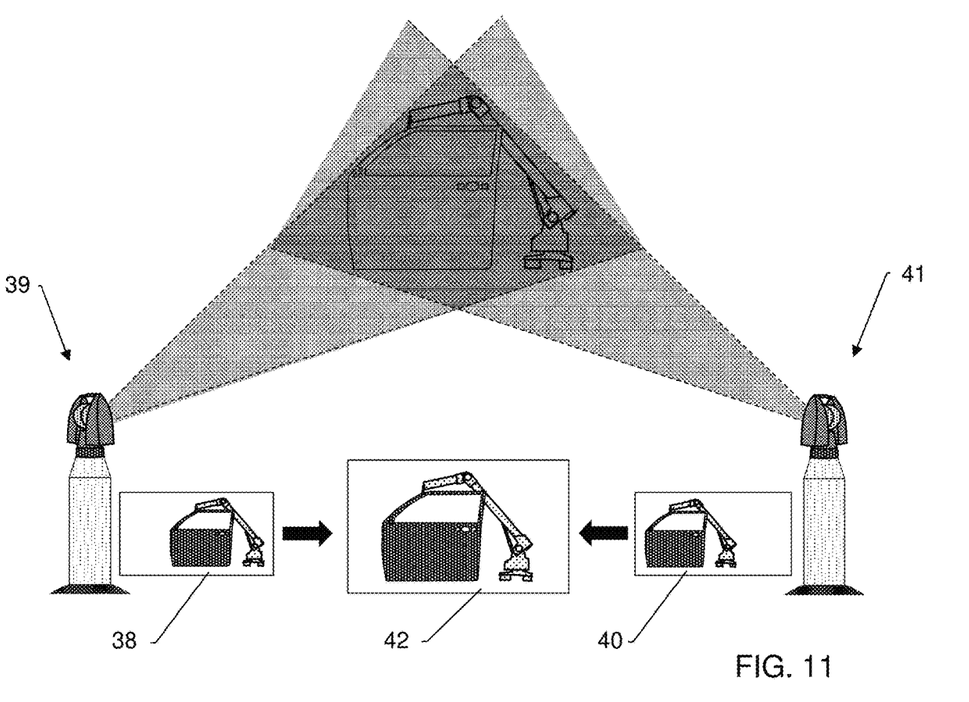
FIG. 11: visualization of the determination of the relative displacement information between a first and a second device position.

FIG. 11 depicts a visualization of the determination of the relative displacement information between a first and a second device position 39, 41. For example, matching pixels in both images are identified and the absolute distance is triangulated/calculated by using information on a relative arrangement of the cameras with respect to each other. Many algorithms are available for this task, such as Feature Matching (SIFT) or Semi-Global-Matching.

By way of example, the selective laser scanner 1 generates a first 3D image 38 of the object of interest from a first device position 39 and a second 3D image 40 of the object of interest from a second device position 41. Afterwards, both 3D images 38, 40 are referenced leading to the relative displacement information between the first and the second device position 39, 41 can be determined, which, for example, can be made available in a depth image 42.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A selective laser scanner for industrial surveying, comprising
 a target component which can be rotated about two axes of rotation and is configured to transmit a distance measuring beam defining a target axis,
 a distance measuring unit configured to carry out a distance measurement by means of the distance measuring beam in a measuring mode, in which the distance measuring unit is set for distance measurement on a diffusely scattering target,
 a first and a second camera arranged on the target component, wherein the first and the second cameras are arranged offset from the target axis in a fixed positional arrangement with respect to each other and have field of views which at least partly overlap each other, and
 a display for displaying an environment image provided by imaging data of at least one of the first and the second camera,
 wherein the measuring mode comprises a user input functionality which is configured to provide:
 displaying the environment image on the display,
 querying a user input, which selects a position in the environment image, particularly wherein the display is embodied as touch screen display for selecting the position in the environment image,
 provision of selection parameters, which define a sub-area of the environment image associated with the position in the environment image,
 analyzing a first image area of an image captured by the first camera, wherein the first image area is associated with the sub-area, and analyzing a second image area of an image captured by the second camera, wherein the second image area is associated with the sub-area, in order to
  identify a distinctive image feature captured by the sub-area, and
  derive a correspondence of the distinctive image feature in the image captured by the first camera and in the image captured by the second camera,
 using the correspondence to derive control data which provide for moving the target component with respect to the two rotation axes such that the target axis is directed onto a position in the environment associated with the position in the environment image.

2. The selective laser scanner according to claim 1, wherein the control data are derived such that an ambiguity due to a parallax by the target axis and the optical axes of the first and the second camera is resolved by mutual use of both the image captured by the first camera and the image captured by the second camera.

3. The selective laser scanner according to claim 1, wherein the correspondence is used to determine a photogrammetric distance by means of photogrammetry, wherein the photogrammetric distance is used to derive the control data, particularly to resolve the ambiguities due to the parallax.

4. The selective laser scanner according to claim 1, wherein the selection parameters are provided as a function of a distance, to set the dimensions of the sub-area as a function of a distance.

5. The selective laser scanner according to claim 1, wherein the display is embodied as touch screen display, wherein
 the selection parameters are provided such that dimensions and shape of the sub-area are matched to dimensions and shape of an area which corresponds to a covering projected vertically onto the display surface by a fingerprint of a user on the display surface when selecting the position in the environment image, and
 the distinctive image feature is identified by carrying out a selection from multiple candidate image features within the sub-area, wherein the candidate image feature which is closest to a central point of the sub-area is identified as the distinctive image feature.

6. The selective laser scanner according to claim 1, wherein the user input functionality is configured
 to generate a zoomed-in environment image for the querying of the user input, such that the position in the environment image is selected by selecting a position in the zoomed-in environment image, and
 to provide the selection parameters such that the sub-area of the environment image is part of the zoomed-in environment image.

7. The selective laser scanner according to claim 1, wherein the user input functionality is configured to generate a depth map of the sub-area, wherein the depth map is used to derive the control data to move the target component onto a further position in the environment associated with a further user input associated with the sub-area, particularly wherein an ambiguity due to the parallax by the target axis and the optical axes of the first and the second camera is resolved, more particularly wherein the user input functionality is configured to provide a selection of the sub-area by user input.

8. The selective laser scanner according to claim 1, wherein the selective laser scanner is configured to
 use the correspondence to determine a photogrammetric distance measuring accuracy associated with a photogrammetric distance measurement involving the distinctive image feature,
 determine a region of interest around the position in the environment as a function of the photogrammetric distance measuring accuracy, and
 carry out a coordinative measurement scan by scanning the region of interest with the distance measuring beam.

9. The selective laser scanner according to claim 1, wherein the selective laser scanner provides access to a database with identification data providing visual attributes of candidate image features, wherein user input functionality is configured to query the database for the identification data and the identification of the distinctive image feature is carried out by using the identification data.

10. The selective laser scanner according to claim 1, wherein the user input functionality is configured to provide the environment image as a view of one of the two cameras or of a synthetic view image generated by images of both cameras, wherein the synthetic view image is calculated, so that it shows the environment from a viewpoint on the target axis.

11. The selective laser scanner according to claim 1, wherein the laser scanner, particularly the user input functionality, is configured to provide a panorama image based on at least two calculated synthetic view images generated on the basis of images of both cameras, in particular wherein the correspondence is used to determine a photogrammetric distance by means of photogrammetry, wherein the photogrammetric distance is used to calculate the at least two calculated synthetic view images.

12. The selective laser scanner according to claim 1, wherein the user input functionality is configured to
provide a pre-selection of a pre-selected area as function of the position in the environment image,
identify at least parts of object features in the pre-selected area and select a distinctive object feature from the at least parts of the object features,
automatically determine geometric parameters of the distinctive object feature to derive object area delimiters around the distinctive object feature which enclose the distinctive object feature, and
use the geometric parameters to provide scan area information for carrying out a coordinative measurement scan within the area delimiters by scanning with the laser beam.

13. The selective laser scanner according to claim 1, wherein the selective laser scanner
use an image of the first camera and an image of the second camera to generate a 3D information of an object to be measured,
use the 3D information to determine a 6DoF pose of the object with respect to the selective laser scanner,
use the 6DoF pose to derive control data for scanning the distance measuring beam along the object according to a defined scan pattern, particularly wherein the scan pattern provides physically equidistant scan points on a surface of the object.

14. The selective laser scanner according to claim 1, wherein the selective laser scanner is configured to
generate a first 3D image of the environment from a first device position,
generate a second 3D image of the environment from a second device position,
determine a reference of the first and the second 3D images with respect to a common coordinate system, and
use the reference to determine relative displacement information between the first and the second device position.

15. The selective laser scanner according to claim 1, wherein the selective laser scanner is configured to combine image data of the first and the second camera to determine geometric parameter providing information on the geometry of an object within the environment image, particularly wherein the geometric parameter is determined by using a depth map or by using a panoramic image derived from the image data of the first and the second camera, and, based thereof, to automatically adapt a scan density of a coordinative measurement scan of the object within the environment image.

16. The selective laser scanner according to claim 7, wherein the selective laser scanner is configured to combine image data of the first and the second camera to determine geometric parameter providing information on the geometry of an object within the environment image, particularly wherein the geometric parameter is determined by using the depth map or by using a panoramic image derived from the image data of the first and the second camera, and, based thereof, to automatically adapt a scan density of a coordinative measurement scan of the object within the environment image.

17. The selective laser scanner according to claim 14, wherein the selective laser scanner is configured to combine image data of the first and the second camera to determine geometric parameter providing information on the geometry of an object within the environment image, particularly wherein the geometric parameter is determined by using a depth map or by using a panoramic image derived from the image data of the first and the second camera, and, based thereof, to automatically adapt a scan density of a coordinative measurement scan of the object within the environment image.

* * * * *